US008096566B2

(12) United States Patent
West (10) Patent No.: US 8,096,566 B2
(45) Date of Patent: Jan. 17, 2012

(54) LOAD TRANSPORTING TARPAULIN

(76) Inventor: Bradley Christian West, Miami, FL (US)

( * ) Notice: Subject to any disclaimer, the term of this patent is extended or adjusted under 35 U.S.C. 154(b) by 877 days.

(21) Appl. No.: 11/943,806

(22) Filed: Nov. 21, 2007

(65) Prior Publication Data

US 2009/0126880 A1    May 21, 2009

(51) Int. Cl.
*B60B 33/08*    (2006.01)
(52) U.S. Cl. .................. 280/79.11; 280/87.01; 16/24
(58) Field of Classification Search .............. 280/18, 280/19, 20, 28.17, 408, 639, 87.01, 79.11, 280/400, 411.1; 16/24, 28
See application file for complete search history.

(56) References Cited

U.S. PATENT DOCUMENTS

| 3,125,353 | A | * | 3/1964 | Göhmann | .......... | 410/51 |
| 3,522,951 | A | * | 8/1970 | Tyson | .......... | 280/842 |
| 5,379,485 | A | * | 1/1995 | Oshins et al. | .......... | 16/24 |
| 5,449,224 | A |  | 9/1995 | Johnson | | |
| 6,746,028 | B2 | * | 6/2004 | Barbee | .......... | 280/20 |
| 6,926,293 | B1 | * | 8/2005 | Pope | .......... | 280/79.11 |
| 6,964,421 | B2 | * | 11/2005 | Friel | .......... | 280/47.31 |
| 2006/0279054 | A1 | * | 12/2006 | Chung et al. | .......... | 280/79.11 |
| 2008/0224429 | A1 | * | 9/2008 | Watson | .......... | 280/19 |

FOREIGN PATENT DOCUMENTS

| JP | H05-075050 U | 10/1993 |
| KR | 20-1996-0037150 U | 10/1996 |

OTHER PUBLICATIONS

The Internationa Bureau of WIPO, "International Preliminary Report on Patentability," issued May 25, 2010.

\* cited by examiner

*Primary Examiner* — John Walters
(74) *Attorney, Agent, or Firm* — Moazzam & Associates, LLC (57) ABSTRACT

Devices and methods are disclosed which relate to the transportation of loads. A strong and flexible platform has a plurality of ball casters attached to its underside to carry a load by dragging the platform along the ground. The plurality of ball casters on the bottom allow it roll while the flexible platform allows it to match the contour of the ground surface. The platform is outfitted with a removable rigid frame, handles, and grommets. A wagon attachment can be attached on top of the platform to transport loose loads such as leaves and other yard waste, and a rigid tub can be inserted into the wagon attachment for denser loads such as soil and sand. The platform can be pulled by hand, animal or vehicle.

18 Claims, 10 Drawing Sheets

LOAD TRANSPORTING TARPAULIN

BACKGROUND OF THE INVENTION

1. Field of the Invention

The present invention relates to load transportation. More specifically, the present invention relates to the transportation of various sized and shaped loads.

2. Background of the Invention

In many industries, there are times when large amounts of goods, equipment and waste need to be transported. For larger loads and distances, trucks and/or trailers pulled by trucks are used. For smaller projects, for instance transporting leaves, shrubs, and weeds, plastic lawn and leaf bags may be used. However, these common methods have their disadvantages. For example, such bags may not be able to handle larger loads, and may even tear or rupture during lifting or transport. They further do not have the ability to transport loads of varying sizes. They also must be carried by hand and cannot be towed by a vehicle or pulled by hand when needed without risking rupture of the bag.

In many industries, such as logging and landscaping, there is a great amount of logs, trees, leaves, shrubs, weeds, and equipment that need to be constantly transported. Depending on the size of the project, loads may be transported many times in one day, and over significant distance. For larger projects, yielding larger loads, trailers pulled by trucks are often used. This is a solid and sturdy form of transportation for the load, having a wooden or metal bed atop at least two wheels. However, these trailers can be large and heavy themselves, often adding to the burden of positioning such trailers in areas with sensitive ground or limited space. For smaller projects, landscapers often use plastic lawn and leaf bags. This is a smaller form of container commonly used for loads of yard waste. However, the opening of the bag can be hard to keep open, especially when it is first being filled. These bags are typically disposable, one-time use, and are prone to rips and tears from sharp yard waste even during routine use. Large stores and factories use relatively large plastic or metal wheeled carts to move products in bulk. Because of limited storage, there is a limited number of these carts available to workers.

In the home, furniture, appliances, and other large household items can be difficult to move-in or relocate. Typically these items have to be picked up and carried. Some heavier appliances and furniture require extra equipment to relocate. A dolly can be used to cart in furniture or appliances on wheels, but it requires careful balancing during relocation and is prone to tipping over which can damage the load or hurt the mover. Straps can be used to secure a load to a dolly, but if the dolly is allowed to tip over fast enough the load may become damaged upon impact. A dolly usually only holds one item, or in some cases a single column of stackable of items. Most dollies do not have a collapsible form and can be inconvenient when it comes to storage. The dollies that can collapse still have the two wheels either side, and these wheels can be large depending on the application. When moving into a new place there can be a lot of furniture and appliances to move inside, requiring either multiple dollies and workers, or a large time commitment.

Tarpaulins, or tarps, have been in use for many years now, and still have a variety of uses today. Originating as tarred canvas palls used by sailors to cover ships, tarps have evolved into many different shapes, sizes, strengths, and qualities. While still being used to cover ships, the canvas is usually coated in polyethylene, latex, or some other water resistant coating. Some tarps are made out of woven polyethylene making them completely waterproof. Tarps are used for shelter in the military and while camping, or to protect a vehicle from the elements. Large scale tarps are used to keep baseball and other fields dry during rain. Tarps can be used to pull a load across the ground, but usually this leads to ripping and tearing of the tarp over time. Even lightweight loads can damage a tarp when drug across a rugged surface.

Though tarps come in a variety of shapes, most are rectangular. The corners and sides of a tarp contain grommets for rope to pass through which can be used as tie points. Tarps made from woven polyethylene are completely waterproof. Tarps made from canvas or polyester can be fire retardant, but not quite fire proof. A latex or polyvinyl chloride (PVC) coating on the canvas and polyester tarps increases its fire resistance. Another type of tarp, called perforated tarp, is a tarp with a series of small holes in it, giving it a more net-like quality. These perforated tarps are used for large scale billboard advertisements and to protect scaffolding while allowing air and water to pass through.

Although there is common use of tarps in a variety of different fields, there are still significant drawbacks in their use. Thus, there is a need in the art for a technique and device for transportation for loads of varying sizes and shapes. Such device should be able to be pulled by hand or by vehicle that is strong and tough enough to contain larger loads, yet lightweight for smaller loads pulled by hand. Further, such device should be lightweight, easy to use and easy to manufacture.

SUMMARY OF THE INVENTION

The present invention provides for a technique and device that can be used to pull or push a variety of different types of loads easily and effectively without suffering from the drawbacks of the conventional techniques in use today. Such novel device may be a strong collapsible tarp with a plurality of ball casters on the bottom. The ball casters allow the tarp to be pulled across a ground surface while transporting a heavy load on the top. The tarp is light in weight and easy to use. The tarp is made of flexible material so that it can be folded or rolled up for compact storage when not in use. Once loaded, the tarp can be pulled by hand or by vehicle for larger loads.

Furthermore the present invention has a plurality of uses. In logging one may lay the tarp on the ground while logs are carried, thrown, or even rolled onto the tarp. The tarp is made of a strong material that is resistant to tearing even with heavy loads atop it. The tarp may also include grooves, guides, or rivets for adding attachments. For instance, a flexible open box can be attached to the top of the tarpaulin to hold leaves and other yard waste. A plastic tub can be inserted into the box for greater stability. For larger loads, multiples of the present invention can be fastened together creating a much larger surface upon which to place the load. A flap at the bottom of a first tarpaulin is inserted through a hole at the top of a second tarpaulin. The flap attaches to a designated spot on the second tarpaulin which holds the two together as they are pulled.

In one exemplary embodiment, the present invention is a tarpaulin. The tarpaulin includes strong and durable material suitable for logging, landscaping, construction, or other industrial applications. The tarpaulin can be waterproof or have a waterproof coating.

In another exemplary embodiment, the present invention is a tarpaulin. The tarpaulin includes fire resistant material, or a fire resistant coating suitable for use in firefighting. A fireman can rescue a subject or subjects by laying or rolling them onto the tarp, then pulling it by hand out of a fiery environment. The fireman will most likely have a mask and/or oxygen, but the subject may not. Using the present invention the subject will stay low to the ground during transportation, minimizing exposure to excess smoke and heat. A variation of this embodiment will also work for medics on the battlefield, keeping the wounded soldiers low to the ground to avoid enemy fire.

DETAILED DESCRIPTION OF THE INVENTION

The present invention presents a novel solution to the problem of transporting objects of various sizes, shapes and weights. In one exemplary embodiment, the present invention is a strong collapsible platform with a plurality of ball casters on the bottom surface that allow the platform to be pulled across a ground surface while transporting a heavy load on the top surface. While loaded, the present invention can be pulled by hand, by animal or by vehicle. The platform itself can be made from a variety of heavy duty materials including but not limited to: polyethylene, vinyl, plastic, or canvas for a fire retardant platform. A polyethylene coating can be added to a platform made of any of these materials to make it waterproof. A matrix of ball casters is placed underneath the platform. The matrix may consist of an even and plentiful distribution of ball casters. This distributes the pressure of a load across many ball casters, thus allowing the platform to transport even heavy loads. When not in use, the present invention collapses either by rolling or folding it into a compact size.

For purposes of the disclosure, a "tarpaulin" or "tarp" refers to any strong collapsible platform made from any synthetic or natural material. A "load" refers to the mass that needs transportation. This mass may comprise a wide variety of natural or artificial objects and substances including but not limited to humans, animals, lumber, leaves, yard waste, and equipment. Other objects and substances, not specifically disclosed but within the scope of one having ordinary skill in the art, are also within the scope of the mass described herein. A "ground surface" refers to a surface across which a load is to be transported. This includes, but is not limited to, smooth, rough and uneven surfaces. Examples of a "ground surface" include but are not limited to a forest floor, a grassy hill, an asphalt street, or even a rocky walkway. A "ball caster" refers to any caster that can move in any direction. This includes casters having a ball to contact the surface or a wheel connected to a swivel such as on the bottom of desk chairs. A "straight roller" refers to a caster that features a wheel for movement in a single direction, or forwards and backwards along the same line. A "vehicle" refers to any mobile structure whether it be self-propelled or manually propelled. Examples of a vehicle include an automobile, a boat, a wagon, a train, or even a dogsled.

Figure 1A:
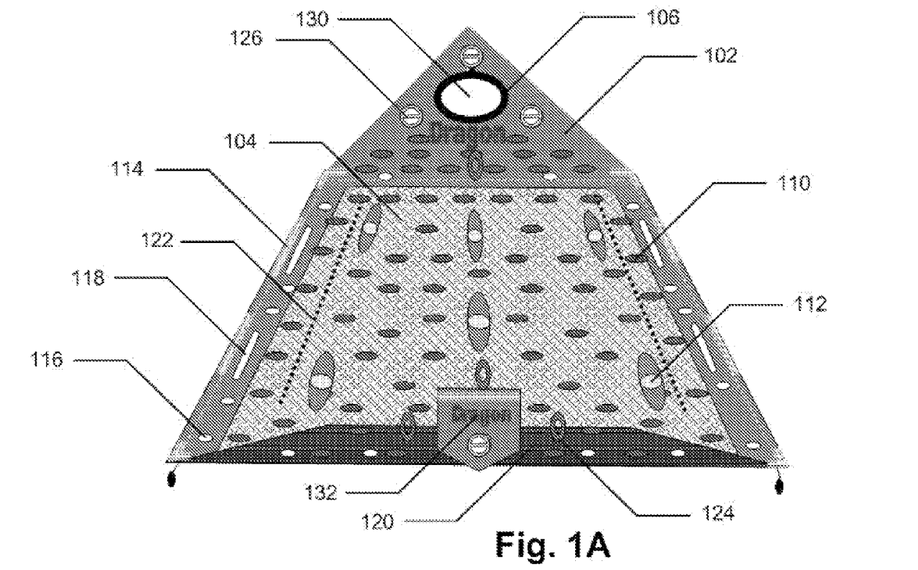
FIGS. 1A-B shows a tarpaulin platform according to an exemplary embodiment of the present invention.
Figure 1B:
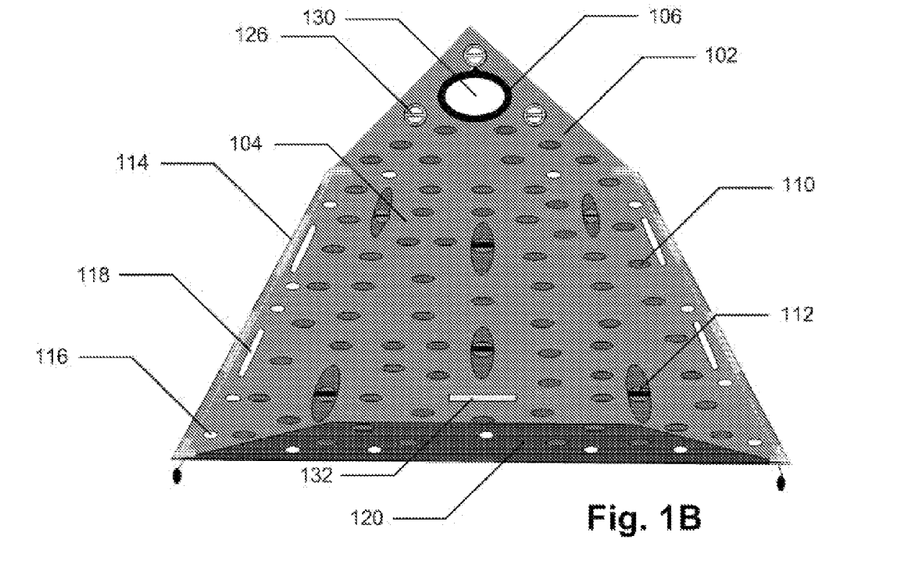

An exemplary embodiment of the present invention, shown in FIGS. 1A and 1B, features a tarpaulin platform divided into two portions. In both figures, hitch 102 comprises the top triangular portion of the platform, and bed 104 comprises the part of the platform below hitch 102. FIG. 1A shows the top surface of the platform, where a load is to be received, while FIG. 1B shows the bottom surface of the platform, where the ball casters are affixed. In FIG. 1A, bed 104 encompasses the majority of the upper surface of the platform with the exception of hitch 102. A matrix of ball casters 110 is arranged mostly under bed 104 with some ball casters also present under hitch 102. The ball casters have a density of about one-and-a-half to two ball casters per square foot of platform area. In addition to the ball casters 110, there are a few straight rollers 112. The straight rollers 112 allow travel in one direction. There are six straight rollers underneath the platform distributed as shown in FIG. 1. The straight rollers help to steer the platform by giving it stability. For instance, on uneven or sloping terrain, straight rollers would prevent the platform from sliding in an unfavorable direction.

Four rigid rods 114 can be placed inside sleeves around the perimeter of bed 104. These rods 114 stretch the bed out for maximum surface area when placed in the sleeves. Rods 114 may be made from fiberglass, plastic, wood, or any other rigid lightweight material. A plurality of holes 116 is located around the perimeter of bed 104, just inside rods 114. Holes 116 are reinforced with grommets of metal or plastic and serve as points to tie rope onto or fix bungee cords. Near the edges of bed 104 there are four elongate rectangular cutouts 118. These cutouts serve as handles 118, and are placed near the rods 114 so that when pulled by these handles the rods 114 take the stress off of the platform. Handles 118 are reinforced with metal, plastic, or any other method in the art.

In this embodiment, a thick elongate slab 120 is placed at the rear of the bed, shown as the bottom in FIG. 1. This is used as a brake 120. The brake, while not used very often, can be stepped on to stop the platform if undesired motion occurs. The weight upon the brake applies a frictional force on the ground surface making it difficult for the platform to slide. Alternately, the platform may be equipped with a deployable anchor to stop movement of the platform by temporarily latching onto the ground surface. This could be used if the user needs to rest or unload part of the load. One or more of the straight rollers may be equipped with a brake. A row of teeth 122 is placed on either side of bed 104, each running substantially lengthwise on the tarpaulin. These rows of teeth 122 are of the type to combine with a complimentary row of teeth which combine to form a zipper to close or compact the tarpaulin.

A large opening is cut out of the middle of hitch 102 and is lined with padding 106 to form the receiving member 130. A tow rope can connect to receiving member 130, allowing the platform to be pulled manually by a human or animal, by a vehicle, or to chain multiple platforms together for larger loads. Straps, bungee type cords, or other rope can also be used to connect receiving member 130 to the vehicle, human, animal, etc. A harness apparent to one skilled in the art can be utilized for an animal or even a human who wishes to have free hands while pulling the platform. Vehicles can use motorized winch to reel in the platform and pull it. A tongue 132 is placed near the center of the bottom of bed 104 to be received by receiving member 130 when connecting multiple platforms in a chain. Four snaps hold a pair of platforms together once tongue 132 has been received by receiving member 130. Three male snaps 124 surround the tongue while tongue 132 has one female snap 126 on it. Three female snaps 126 surround receiving member 130 while a single male snap 124 lies below it. These snaps may be used to connect multiple tarpaulins together or fold up a single tarpaulin.

Figures 2A, 2B:
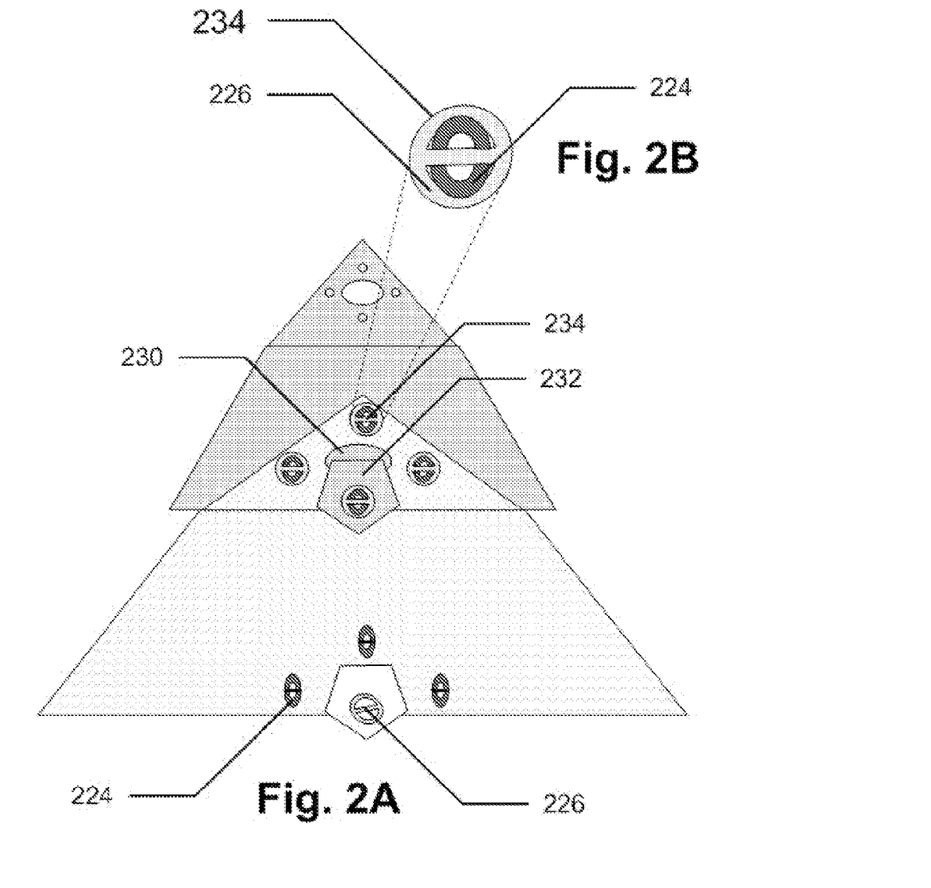
FIGS. 2A-C shows a connection of two platforms according to an exemplary embodiment of the present invention.
Figure 2C:
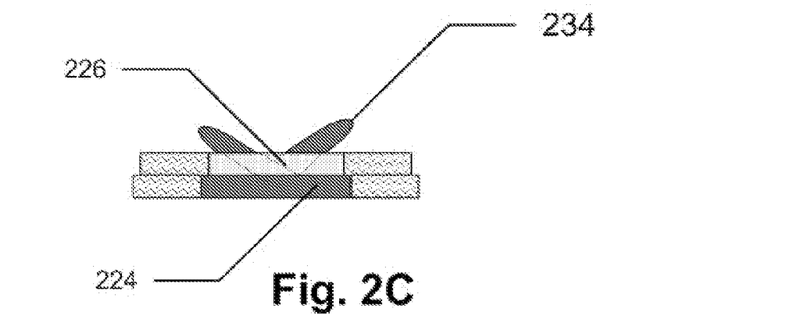

The arrangement of two platforms is shown in FIG. 2, according to an exemplary embodiment of the present invention. FIG. 2A shows two platforms aligned head-to-toe, with tongue 232 received by receiving member 230. FIG. 2B shows a close-up view of a complete snap 234 formed when male snap 224 mates with female snap 226. FIG. 2C shows the side view of a complete snap 234. Male snap 224 has a metal base from which two metal loops rise out at about a thirty degree angle in opposite directions as shown in FIG. 2C. Female snap 226 is a metal loop slightly smaller than the area covered by the two metal loops of male snap 224. To form a complete snap 234, female snap 226 is placed directly over male snap 224 and firmly pressed against male snap 224. Female snap 226 will pop over the metal loops of male snap 224. To disconnect, female snap 226 is pulled up, directly away from male snap 224, until female snap 226 pops back over the metal loops of male snap 224. With respect to FIG. 2C, the force to snap and unsnap is applied vertically. However, while connected, the force applied to complete snap 234 is horizontal with respect to FIG. 2C, and any horizontal forces are substantially secured by the arrangement. Complete snap 234 should not come apart accidentally during use.

The present invention does not limit the fastening mechanism to the one described above. Other fastening mechanisms should be apparent to one skilled in the art and are within the scope of the present invention. The arrangement of platforms should not be limited to the vertical arrangement shown in FIG. 2. Other arrangements, such as side-by-side, should be apparent to one skilled in the art.

Figure 3A:
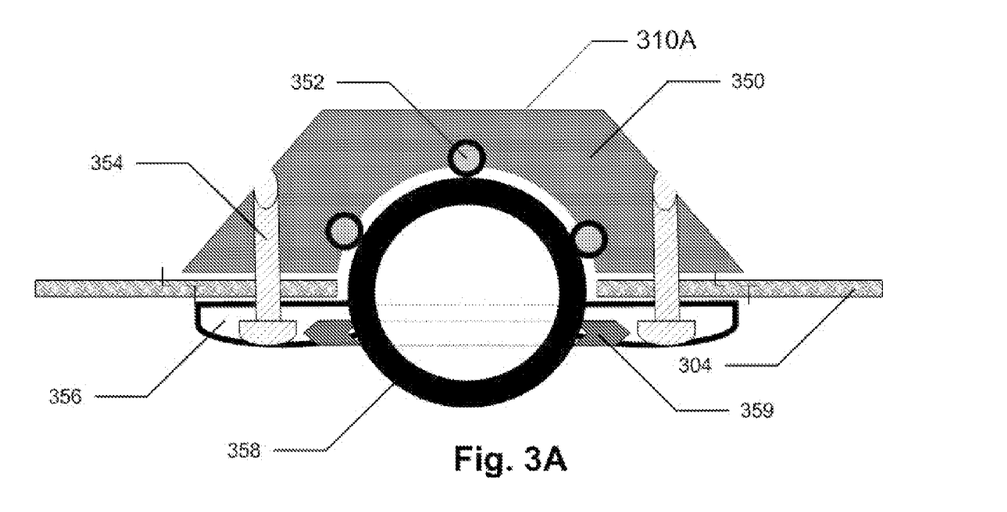
FIGS. 3A-C shows a large ball caster according to an exemplary embodiment of the present invention.
Figure 3B:
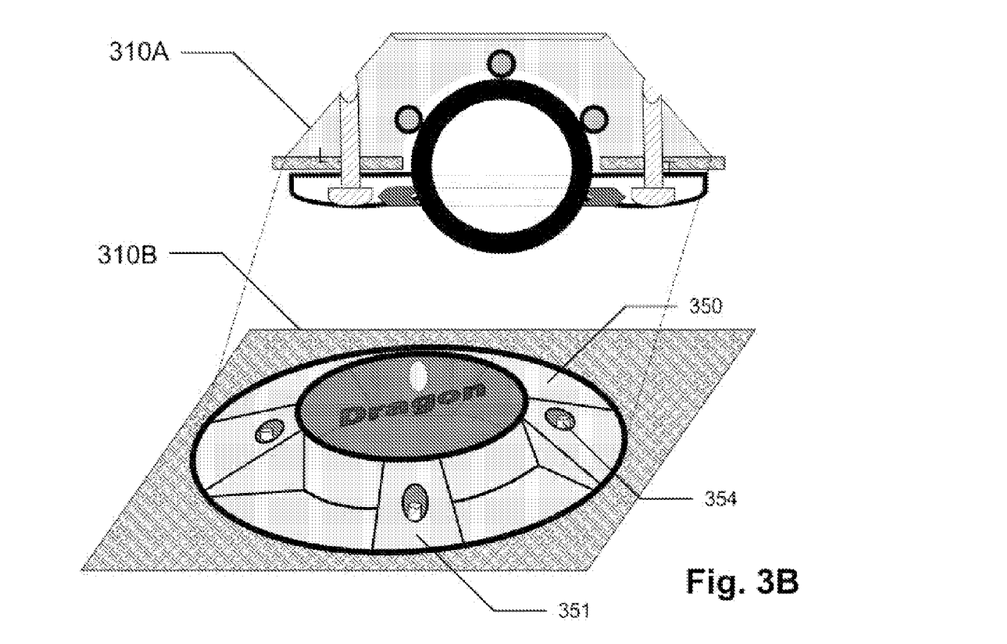
Figure 3C:
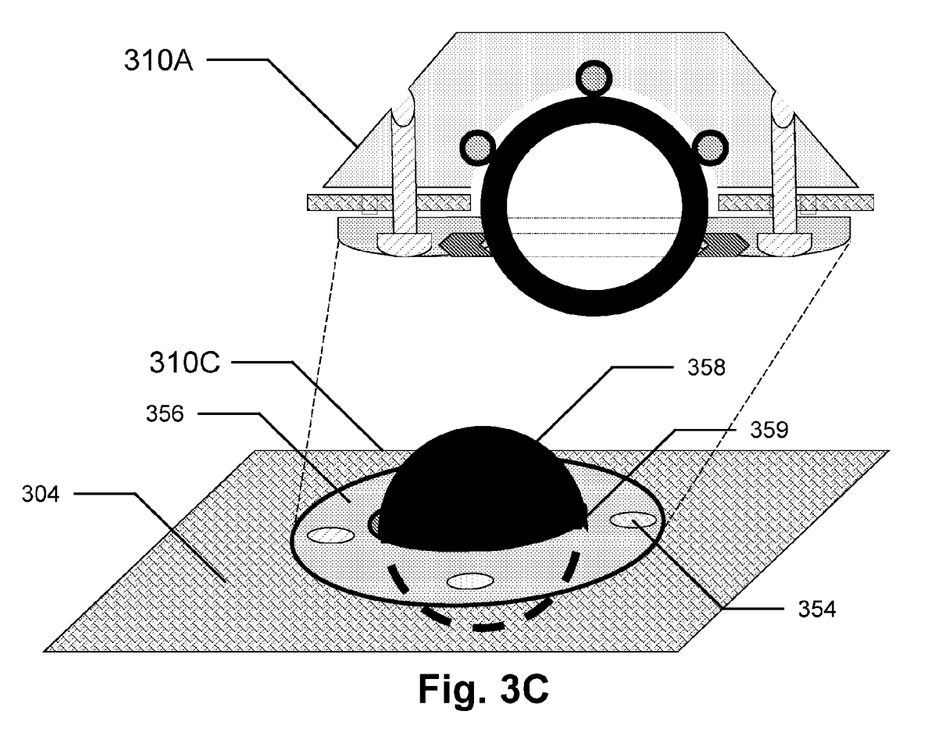

FIG. 3 shows a detailed view of a ball caster 310A according to an exemplary embodiment of the invention. FIG. 3A shows a cross section of a side view of ball caster 310A. FIG. 3B shows a perspective view of the top of ball caster 310B while FIG. 3C shows a perspective view of the bottom of ball caster 310C. Referring to FIGS. 3A and 3C, ball caster 310A has a housing 350, which resides on top of platform 304, and has a cutout for the ball 358. Housing 350 is made of solid plastic, or other strong and lightweight material. Ball 358 should be made from steel or other strong plastic, composite, metal or alloy. Bearings 352 are positioned inside the cutout in between housing 350 and ball 358 to ensure the ball rotates smoothly in any direction. Ball 358 is held inside housing 350 by plate 356. Plate 356 resides on the bottom of platform 304 and has an opening just smaller than the largest diameter of ball 358 in order to hold ball 358 in place. Plate 356 and housing 350 are held together on either side of platform 304 by fasteners 354. Fasteners 354 can be screws, nails, bolts, brads, staples, or any other conventional fastener. Plate 356 and fasteners 354 should also be made of steel or other strong metal, plastic or composite, preferably stainless steel for water and weather resistance. A flange 359 inside the inner opening of plate 356 protects bearings 352 from dust, dirt, moisture and other debris. Flange 359 can be a thick arrangement of plastic bristles, a rubber seal, or any other material that is relatively impermeable to dust, dirt, and debris.

FIG. 3B shows a perspective view where housing 350 can be seen in detail. Housing 350 is flat on top, with four rigid flanges 351 sloping down from the top to the base near the platform 304. Each rigid flange 351 receives a fastener 354. FIG. 3C shows the bottom view where fasteners 354 can be seen holding plate 356 to the housing and platform 304. Plate 356 holds ball 358 in position while allowing it to rotate freely in any direction.

Figure 4:
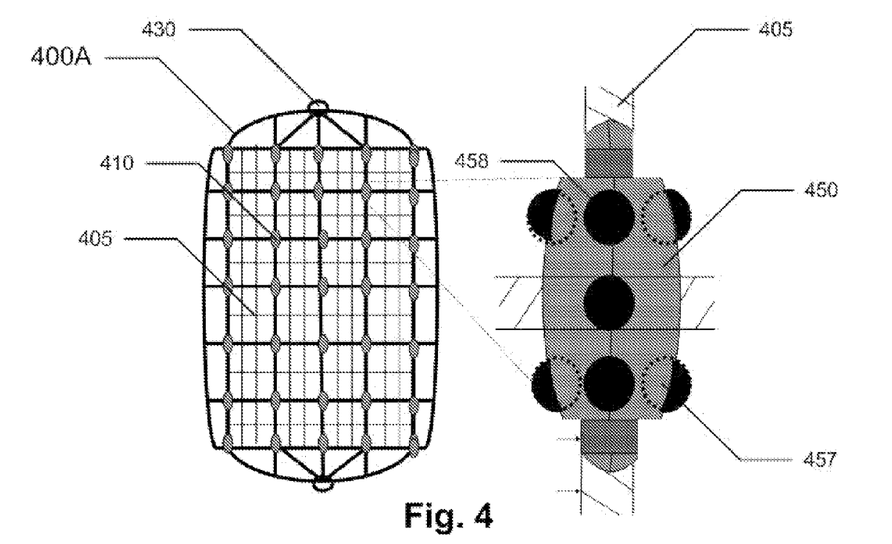
FIG. 4 shows a rope lattice platform according to an exemplary embodiment of the present invention.

In another exemplary embodiment shown in FIG. 4, the present invention features a platform made of a lattice, net, or web of interwoven rope or fabric metal or composite 405. Ball casters 410 are arranged at several major intersections of interwoven rope 405. This rope platform 400A is made of thick nylon rope or other rope of comparable strength. A receiving member 430 is placed at both ends of this embodiment to give a user a choice from which end to pull. Each ball caster 410 may consist of a housing 450, three balls 458 protruding out of the bottom of housing 450, and four side balls 457 protruding out of the side of housing 450. The interwoven rope platform yields less stability for the ball casters 410, but is lighter in weight overall. The decreased stability can lead to a rotation of housing 450 during use. To compensate, ball casters 410 have a total of seven balls arranged around the bottom of housing 450. As shown in FIG. 4, one ball is in the center of the bottom while the other balls surround the center ball so that no matter how housing 450 rotates, at least one ball will remain in between the ground surface and the platform while in use.

Figure 5:
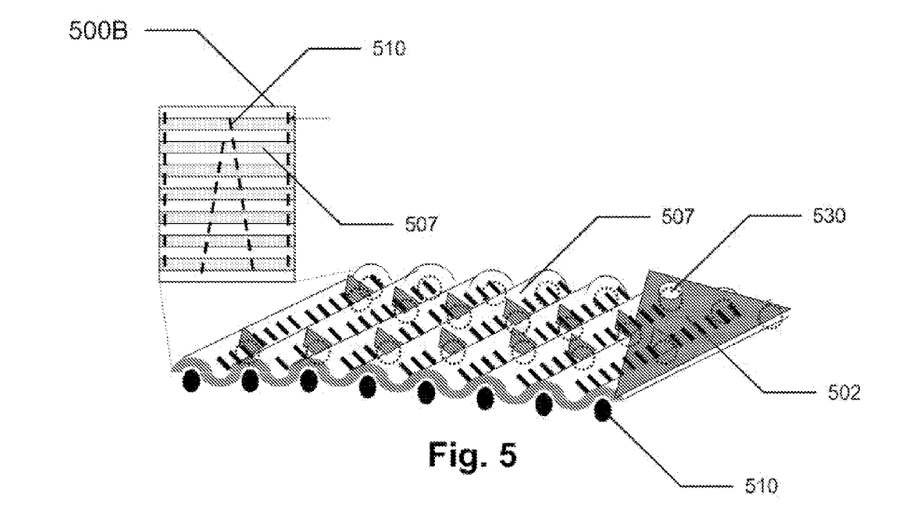
FIG. 5 shows a collapsible panel platform according to an exemplary embodiment of the present invention.

In yet another exemplary embodiment, shown in FIG. 5, the present invention features a platform of a plurality of long, flat panels 507. Each panel 507 is the width of the platform, and is hinged to the two adjacent panels using conventional techniques. When in use, panels 507 lay flat or in contour with the ground surface. When in storage, the panels collapse together, like an accordion or fan, into a smaller package. The panel platform can conform to differences in height of the ground surface in a vertical direction as it is shown in 500B, but not to differences in height of the ground surface in a horizontal direction as it is shown in 500B. For this reason fewer ball casters are required to hold the platform above the ground surface. In this embodiment, ball casters 510 are arranged in a vertical line on either side as shown in 500B, with two more lines of ball casters 510 towards the middle of the panels for support. A hitch 502 is attached to the front of the platform where a receiving member 530 is cut out. The hitch in this embodiment can be made of the same material as the panels 507, or any of the materials used to make the tarpaulin platform.

Figure 6:
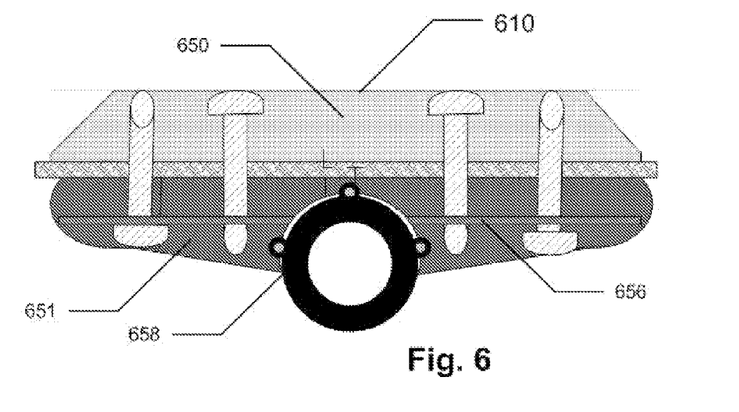
FIGS. 6-7 show a small ball caster according to an exemplary embodiment of the present invention.
Figure 7:
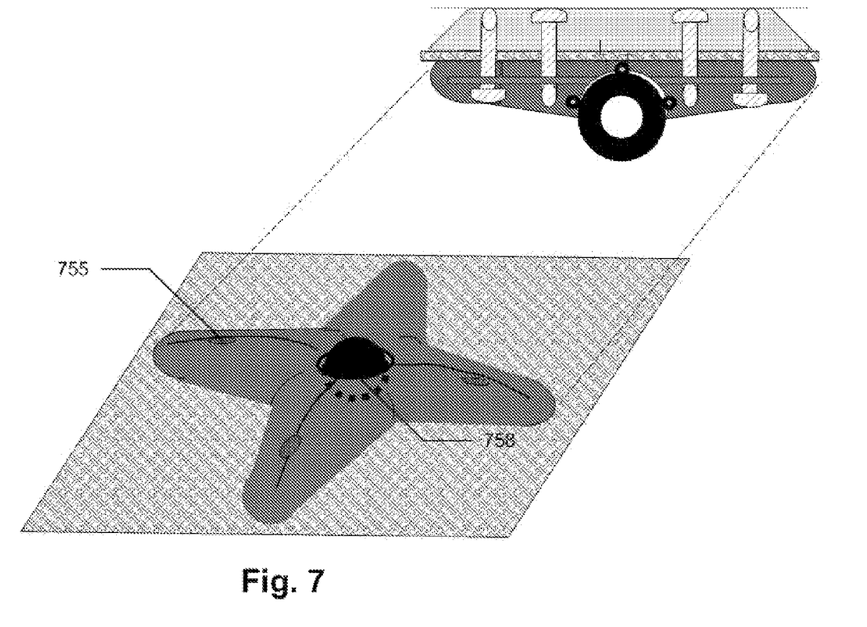

In another embodiment of the ball casters, shown in FIGS. 6 and 7, ball caster 610 features a dual housing and a smaller ball. The housing is split into an upper housing 650, which is placed above the platform, and a lower housing 651, which is placed underneath the platform. Ball 658 is smaller than in the embodiment shown in FIG. 3, and is contained in lower housing 651. Plate 656 is embedded in lower housing 651. Though ball 658 is smaller, lower housing 651 contours out in four flanges as shown in FIG. 7. Designed this way, lower housing 751 prevents accidental rotation of the ball caster, and also prevents the platform from getting caught underneath a caster during use. However, because ball 758 is smaller, this embodiment of the ball caster may be better suitable in applications requiring lighter loads.

Figure 8:
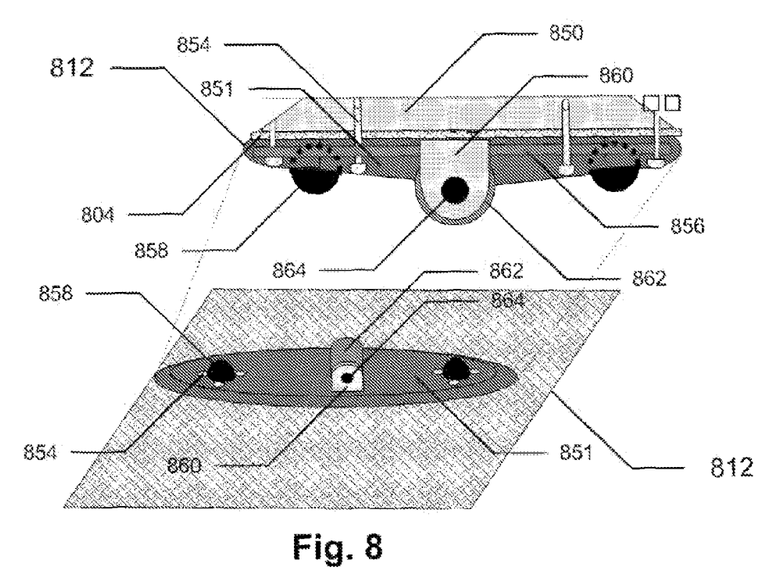
FIG. 8 shows a straight roller according to an exemplary embodiment of the present invention.

An embodiment of the straight roller, shown as 112 in FIG. 1, is shown in more detail in FIG. 8. Like ball caster 610, straight roller 812 features an upper housing 850 and a lower housing 851 on either side of platform 804. Fasteners 854 hold upper housing 850 and lower housing 851 together around platform 804. Plate 856 is embedded in lower housing 851. Lower housing 851 also contains flanges 860, which protrude out of the bottom of lower housing 851. Cylinder 862 is placed in between flanges 860 and a pin 864 holds it there. Pin 864 runs through flanges 860 and through the center of cylinder 862 allowing cylinder 862 to rotate. Two balls 858 are placed on either side of cylinder 862 and are held in lower housing 851 in a freely rotating manner as in the other embodiments, so that cylinder 862 is always in contact with the ground surface.

Figure 9:
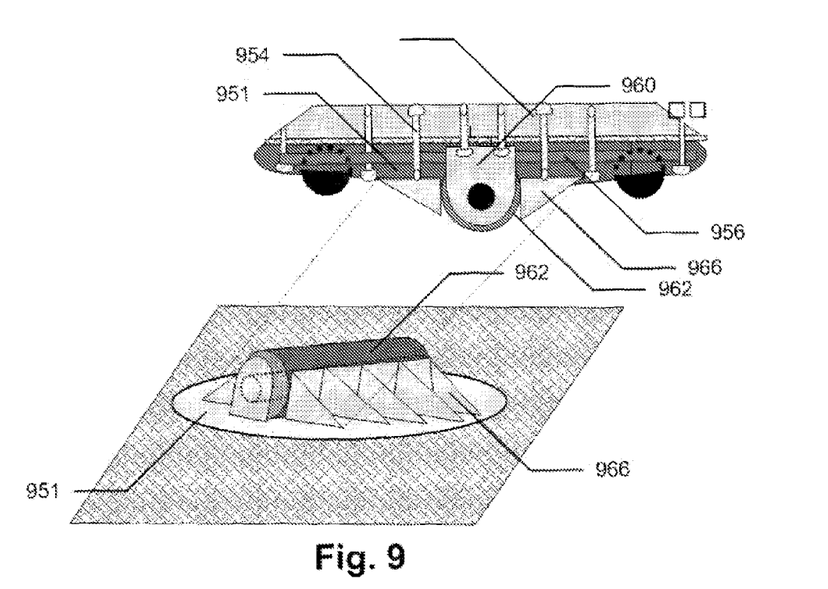
FIG. 9 shows a flanged straight roller according to an exemplary embodiment of the present invention.

Another embodiment of the straight roller, shown in FIG. 9, features more reinforcements for heavier load applications. More fasteners 954 are used to attach upper housing 950 to lower housing 951. On either side of cylinder 962 are two vertical walls 966, each with a series of flanges connecting the wall to lower housing 951. These guards 966 help to keep cylinder 962 in place as well as block dirt, dust, and debris from getting in between cylinder 962, flanges 960, and lower housing 951.

Figure 10A:
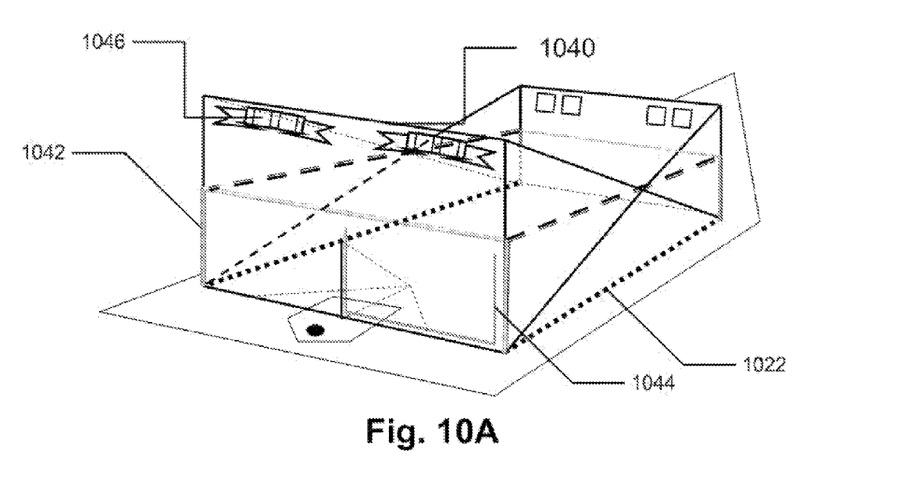
FIGS. 10A-B show a wagon attachment according to an exemplary embodiment of the present invention.
Figure 10B:
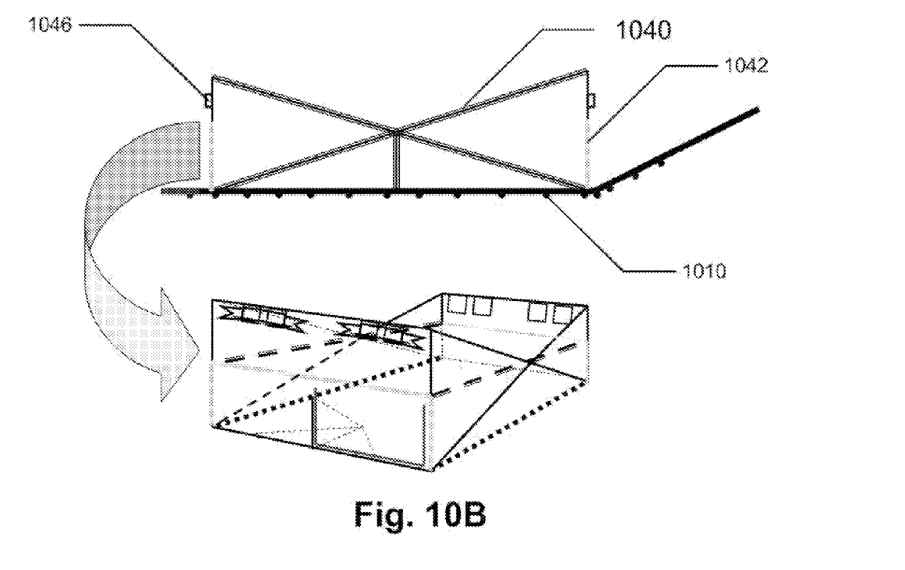

To help with the transportation of certain loads, a wagon attachment 1040, shown in FIGS. 10A and 10B, can be attached to the top of the tarpaulin. The rows of teeth 1022, shown as 122 in FIG. 1, lock together with complementing rows of teeth 1022 on the bottom of the sides of wagon attachment 1040, like a zipper. The walls of wagon attachment 1040 can be made of any of the materials used to make the tarpaulin platform. The walls are held up and in place by rods 1042, which are made from a rigid plastic, wood, fiberglass, or any other material of comparable strength and weight. A zippered door 1044 is featured on wagon attachment 1040 which can be opened for access while wagon attachment 1040 is carrying a load. Zippered door 1044 is shown on the rear of the platform, but wagon attachment 1040 can also be oriented so that zippered door faces the front of the platform. Rows of teeth 1022 are identical on either side making the reverse orientation of wagon attachment 1040 possible and simple. Handles 1046 are placed toward the top of the front and rear sides of wagon attachment 1040. When wagon attachment 1040 is holding a load, it can be unzipped at rows of teeth 1022 and lifted manually by these handles 1046. This can be useful when the load is leaves, grass, mulch, or yard waste.

Figure 11:
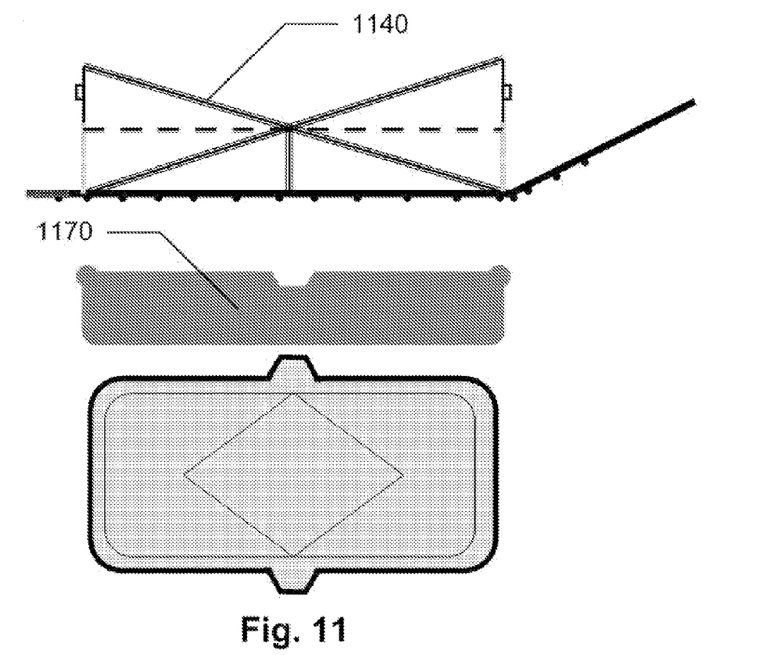
FIG. 11 shows a rigid tub attachment according to an exemplary embodiment of the present invention.

For denser loads such as soil and sand, a rigid tub 1170, as shown in FIG. 11, can be inserted into wagon attachment 1140. Rigid tub 1170 is made from a rigid plastic, wood, fiberglass, composite, or any other material of comparable strength and weight. For more industrial application rigid tub 1170 can be made of metal. The length and width of rigid tub 1170 complements that of wagon attachment 1140 so that it fits just inside. The depth of rigid tub 1170 is shown at about half the depth of wagon attachment 1170, but this may vary depending on the specific application.

Figure 12:
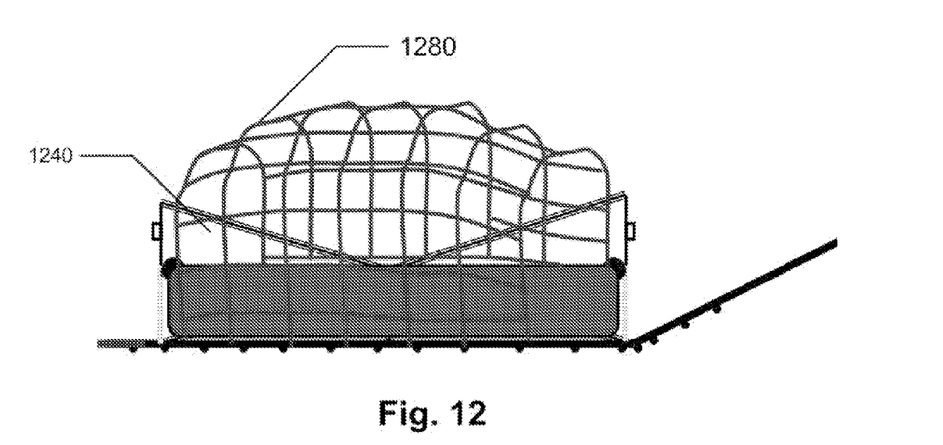
FIG. 12 shows a netting attachment according to an exemplary embodiment of the present invention.

To keep the contents of the load intact during transportation, a net 1280 can be pulled over the load, and attached around the perimeter of the platform, as shown in FIG. 12. Net 1280 is made of a strong and preferably elastic material. At its smallest, net 1280 should be able to keep intact the smallest of loads, but net 1280 can expand to cover loads that take up the entirety of wagon attachment 1240. Net 1280 attaches to the perimeter of the platform via hook and loop, snaps, tying through the holes (shown as 116 in FIG. 1), or any other fastening technique in the art.

Figure 13:
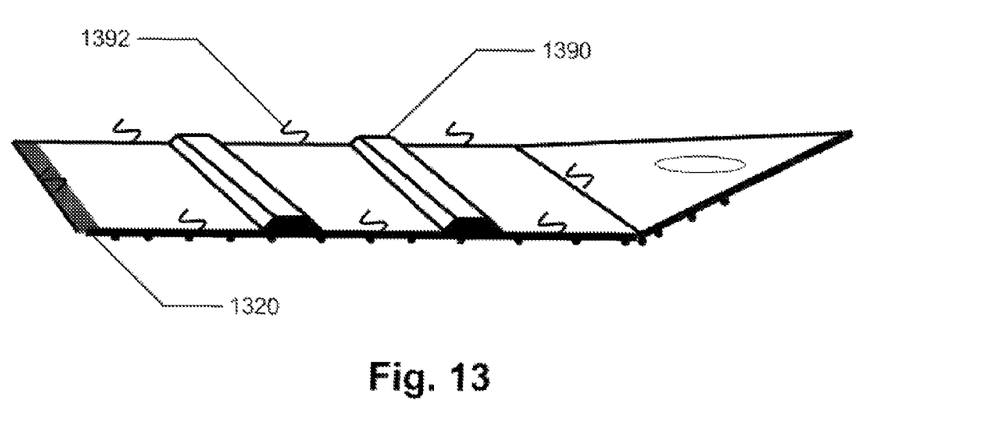
FIG. 13 shows an industrial tarpaulin platform according to an exemplary embodiment of the present invention.

Another exemplary embodiment of the present invention, shown in FIG. 13, features an industrial tarpaulin platform including two forklift guides 1390 and hooks 1392. Forklift guides 1390 comprise rigid sheaths, with openings on both ends, designed to accommodate a standard forklift as will be readily apparent to one skilled in the art. The pair of forklift guides 1390 are located centrally on the bed of the platform. As shown in FIG. 13, forklift guides 1390 are oriented parallel to brake 1320, but other orientations are within the scope of this invention including an orientation perpendicular to brake 1320. Forklift guides 1390 are preferably made from a strong metal such as steel. Hooks 1392 are arranged in an even distribution around the perimeter of the platform in this embodiment. These hooks 1392 serve as additional contact points for rope, bungee type cords, straps, or a net such as net 1280 in FIG. 12. Hooks 1392 are preferably made of thick gauge metal wire such as steel. The typical wood pallet, as can be readily apparent to one skilled in the art, can be placed on top of this embodiment so that it could be picked up by a standard forklift. The load, such as a wooden pallet with a mass of products, can be held in place by rope, bungee type cords, straps, or a net attached to hooks 1392 located around the perimeter of the platform. This can also help to unload large trucks. With the platform raised by a forklift to the level of a truck bed, large heavy loads can be transferred from the truck to the platform. The forklift can then lower the platform or move it to another location. If the truck bed is level to the ground, as in many loading/unloading bays, large heavy loads can be pushed or pulled on the platform to arrange inside the truck bed and unload without the use of a forklift. Due to the industrial application of this embodiment, all elements are preferably made from strong and durable materials.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, the exact size, number and dimensions of various elements in this application are presented for illustrative purposes only and the present invention is not limited to the exact size, number and dimensions presented in such examples. Variations may be made to account for different uses of the invention in different environments, including but not limited to yard, home, office, industrial, military, etc. Such variations are numerous and are not each presented here for sake of simplicity, but are all within the scope of the present invention. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A load transporting apparatus comprising:
  a platform made from a strong and collapsible material;
  a receiving member coupled to the platform;
  a first side of the platform onto which a load is receivable; and a plurality of ball casters attached to a second side of the platform, each ball caster including a housing, the housing having a plurality of cutouts, a center ball protruding from a first cutout of the housing, and at least three surrounding balls, each surrounding ball protruding from a corresponding cutout from the plurality of cutouts, each corresponding cutout being located on a side of the housing;

wherein at least one of the center ball and the surrounding balls remain in contact with a ground surface when the housing is rotated to any degree; and wherein the plurality of ball casters are arranged with density such that contact between the platform and the ground surface is prevented while the platform is pulled along the ground surface.

2. The apparatus of claim 1, further comprising a plurality of straight rollers attached to the second side of the platform.

3. The apparatus of claim 1, wherein the strong and collapsible material is collapsible enough to fold.

4. The apparatus of claim 3, wherein the strong and collapsible material is waterproof.

5. The apparatus of claim 1, wherein the platform is attachable to more platforms of substantial similarity in a chain.

6. The apparatus of claim 1, wherein a receptacle is attachable to the first side of the platform for receiving and containing loads.

7. The apparatus of claim 1, wherein a net is spread substantially over the load and is attachable to the platform.

8. A tarpaulin apparatus comprising:
a tarpaulin having a first side onto which a load is receivable; and
a plurality of ball casters attached to a second side of the tarpaulin, each ball caster including a housing, the housing having a plurality of cutouts, a center ball protruding from a first cutout of the housing, and at least three surrounding balls, each surrounding ball protruding from a corresponding cutout from the plurality of cutouts, each corresponding cutout being located on a side of the housing;
wherein at least one of the center ball and the surrounding balls remain in contact with a ground surface when the housing is rotated to any degree; and
wherein the ball casters are arranged evenly and with a density of at least one ball caster per square foot of tarpaulin area.

9. The apparatus of claim 8, wherein the tarpaulin is made from one or more of polyethylene, vinyl, plastic, and canvas.

10. The apparatus of claim 8, wherein the tarpaulin has a tongue at a first end.

11. The apparatus of claim 10, wherein the tarpaulin has a receiving member at a second end for receiving the tongue of another tarpaulin of substantial similarity.

12. The apparatus of claim 8, wherein a wagon attachment is attachable to the first side of the tarpaulin.

13. The apparatus of claim 12, wherein the wagon attachment has four sides and a base of the same material as the tarpaulin, and an opening at the side opposite the tarpaulin.

14. The apparatus of claim 13, wherein a rigid tub is insertable into the wagon attachment.

15. The apparatus of claim 8, wherein a net substantially the size of the tarpaulin is attachable to the tarpaulin.

16. A method of transporting a load comprising the steps of:
loading a strong and collapsible platform with a load; and
pulling the platform along a ground surface;
wherein the platform includes a plurality of ball casters arranged on a side of the platform that is against the ground surface such that contact between the platform and the ground surface is prevented while being pulled;
wherein each ball caster includes a housing, the housing having a plurality of cutouts, a center ball protruding from a first cutout of the housing, and at least three surrounding balls, each surrounding ball protruding from a corresponding cutout from the plurality of cutouts, each corresponding cutout being located on a side of the housing
wherein at least one of the center ball and the surrounding balls remain in contact with a ground surface when the housing is rotated to any degree.

17. The method of claim 16, wherein the load is one of tree logs, yard waste, mulch, soil, sand, and animals.

18. The method of claim 16, wherein the load is one or more humans.

* * * * *